(12) United States Patent
Lee (10) Patent No.: US 12,541,266 B2
(45) Date of Patent: Feb. 3, 2026

(54) INPUT SENSING DEVICE AND DISPLAY DEVICE INCLUDING THE SAME

(71) Applicant: SAMSUNG DISPLAY CO., LTD., Yongin-si (KR)

(72) Inventor: Choonhyop Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/826,384

(22) Filed: Sep. 6, 2024

(65) Prior Publication Data

US 2025/0103162 A1     Mar. 27, 2025

(51) Int. Cl.
*G06F 3/041*     (2006.01)
*G06F 3/044*     (2006.01)

(52) U.S. Cl.
CPC .... *G06F 3/041661* (2019.05); *G06F 3/04184* (2019.05); *G06F 3/0446* (2019.05)

(58) Field of Classification Search
CPC .......... G06F 3/041661; G06F 3/04184; G06F 3/0446; G06F 3/0412; G06F 3/04166; G06F 3/0416
See application file for complete search history.

(56) References Cited

U.S. PATENT DOCUMENTS

| | | | | |
|---|---|---|---|---|
| 10,224,949 | B1 * | 3/2019 | Li | H03M 1/123 |
| 11,157,116 | B2 * | 10/2021 | Kim | G06F 3/04182 |
| 11,188,171 | B2 * | 11/2021 | Liang | G06F 3/0416 |
| 11,709,567 | B2 | 7/2023 | Kim et al. | |
| 11,740,752 | B1 * | 8/2023 | Derichs | G06F 3/0446 |
| | | | | 345/173 |
| 12,314,558 | B2 * | 5/2025 | Sepehr | G06F 3/0412 |
| 2012/0293444 | A1 * | 11/2012 | Wong | G06F 3/05 |
| | | | | 345/174 |
| 2015/0091859 | A1 * | 4/2015 | Rosenberg | G06F 3/0446 |
| | | | | 345/174 |
| 2019/0114028 | A1 * | 4/2019 | Moseley | G06F 3/0416 |
| 2019/0286263 | A1 * | 9/2019 | Bagheri | G06F 3/0414 |
| 2020/0133455 | A1 * | 4/2020 | Sepehr | G06F 3/0412 |
| 2021/0132769 | A1 * | 5/2021 | Parikh | G06N 3/045 |
| 2022/0057898 | A1 * | 2/2022 | Lee | G06F 3/0412 |

FOREIGN PATENT DOCUMENTS

KR     10-2023-0073411 A     5/2023

* cited by examiner

*Primary Examiner* — Ibrahim A Khan
(74) *Attorney, Agent, or Firm* — F. CHAU & ASSOCIATES, LLC (57) ABSTRACT

An input sensing device includes driving electrodes and sensing electrodes, analog front ends to process sensing signals provided from the sensing electrodes to output demodulation signals, a multiplexer connected to the analog front ends to select one of the demodulation signals, and an analog-to-digital converter to convert an analog output signal provided from the multiplexer into a digital sensing value. Sampling rates of the analog-to-digital converter may be different from each other in different operating modes. Resolutions of the analog-to-digital converter may be different in different operating modes. The input sensing device may be incorporated within a display device for displaying images.

20 Claims, 8 Drawing Sheets

INPUT SENSING DEVICE AND DISPLAY DEVICE INCLUDING THE SAME

CROSS-REFERENCE TO RELATED APPLICATION(S)

This application claims priority under 35 USC § 119 to Korean Patent Application No. 10-2023-0128625, filed on Sep. 25, 2023, in the Korean Intellectual Property Office (KIPO), the entire disclosure of which is incorporated by reference herein.

BACKGROUND

1. Field

One or more embodiments described herein relate to an input sensing device and a display device including the same.

2. Description of the Related Art

A display device may include an input sensing device configured to sense an input of user, such as a touch input. The input sensing device may include a sensing region and a non-sensing region. The sensing region is configured to sense the input. The non-sensing region may include an input sensing circuit configured to generate driving signals for sensing the input and may also be configured to receive sensing signals. The input sensing circuit may include analog front ends configured to receive the sensing signals and analog-to-digital converters configured to convert analog sensing signals into digital sensing values.

When the number of analog front ends and the analog-to-digital converters equals the number of sensing signals, there may be a limitation in the ability to reduce the area of the input sensing circuit. In addition, when sampling rates and resolutions (or resolving powers) of the analog-to-digital converters are equal to each other in one or more operating modes, power consumption of the input sensing circuit may be unnecessarily increased.

SUMMARY

One or more embodiments described herein may provide an input sensing device with low power consumption.

One or more embodiments described herein may provide an input sensing device with fewer components and reduced size.

One or more embodiments described herein also provide a display device which use the input sensing device to achieve low power consumption.

An input sensing device according to embodiments may include driving electrodes and sensing electrodes, analog front ends configured to process sensing signals provided from the sensing electrodes to output demodulation signals, a multiplexer connected to the analog front ends, and configured to select one of the demodulation signals, and an analog-to-digital converter configured to convert an analog output signal provided from the multiplexer into a digital sensing value. Sampling rates of the analog-to-digital converter may be different from each other in different operating modes.

In an embodiment, the operating modes may include a normal mode and a standby mode, and a second sampling rate of the analog-to-digital converter in the standby mode may be lower than a first sampling rate of the analog-to-digital converter in the normal mode.

In an embodiment, the operating modes may further include a low power mode, and a third sampling rate of the analog-to-digital converter in the low power mode may be lower than the second sampling rate.

In an embodiment, the operating modes may further include a high speed mode, and a fourth sampling rate of the analog-to-digital converter in the high speed mode may be higher than the first sampling rate.

In an embodiment, resolutions of the analog-to-digital converter may be different from each other according to the operating modes.

In an embodiment, the operating modes may include a normal mode and a standby mode, and a second resolution of the analog-to-digital converter in the standby mode may be lower than a first resolution of the analog-to-digital converter in the normal mode.

In an embodiment, the operating modes may further include a low power mode, and a third resolution of the analog-to-digital converter in the low power mode may be lower than the second resolution.

In an embodiment, the operating modes may further include a high speed mode, and a fourth resolution of the analog-to-digital converter in the high speed mode may be higher than the first resolution.

In an embodiment, the multiplexer may be connected to the analog front ends at 1:k (where k is a natural number that is greater than 1).

In an embodiment, each of the analog front ends may include a charge amplifier configured to amplify a sensing signal corresponding to the analog front end among the sensing signals to output an amplification signal, and a demodulator configured to demodulate the amplification signal to output a demodulation signal corresponding to the analog front end among the demodulation signals.

In an embodiment, the demodulator may include a band pass filter configured to output a signal obtained by filtering the amplification signal by selecting a specific frequency band, a mixer configured to change a frequency of the signal obtained through the filtering to output a frequency conversion signal, and a low pass filter configured to filter a noise component of the frequency conversion signal to output the demodulation signal.

In an embodiment, the input sensing device may further include a driving signal generator configured to provide driving signals to the driving electrodes, and a signal processor configured to sense an external input based on the sensing value.

An input sensing device according to embodiments may include driving electrodes and sensing electrodes, analog front ends configured to process sensing signals provided from the sensing electrodes to output demodulation signals, a multiplexer connected to the analog front ends, and configured to select one of the demodulation signals, and an analog-to-digital converter configured to convert an analog output signal provided from the multiplexer into a digital sensing value. Resolutions of the analog-to-digital converter may be different from each other in different operating modes.

In an embodiment, the operating modes may include a normal mode and a standby mode, and a second resolution of the analog-to-digital converter in the standby mode may be lower than a first resolution of the analog-to-digital converter in the normal mode.

In an embodiment, the operating modes may further include a low power mode, and a third resolution of the analog-to-digital converter in the low power mode may be lower than the second resolution.

In an embodiment, the operating modes may further include a high speed mode, and a fourth resolution of the analog-to-digital converter in the high speed mode may be higher than the first resolution.

In an embodiment, the multiplexer may be connected to the analog front ends at 1:k (where k is a natural number that is greater than 1).

A display device according to embodiments may include a display panel configured to display an image, driving electrodes and sensing electrodes disposed on the display panel, analog front ends configured to process sensing signals provided from the sensing electrodes to output demodulation signals, a multiplexer connected to the analog front ends, and configured to select one of the demodulation signals, and an analog-to-digital converter configured to convert an analog output signal provided from the multiplexer into a digital sensing value. Sampling rates of the analog-to-digital converter may be different from each other in different operating modes.

In an embodiment, resolutions of the analog-to-digital converter may be different from each other according to the operating modes.

In an embodiment, the multiplexer may be connected to the analog front ends at 1:k (where k is a natural number that is greater than 1).

In the input sensing device and the display device according to the embodiments, the multiplexer may connects a plurality of analog front ends to one analog-to-digital converter, so that an area of an input sensing circuit included in the input sensing device may be reduced. Further, the sampling rates and/or the resolutions of the analog-to-digital converter may be different from each other according to the operating modes, so that power consumption of the input sensing device may be reduced.

In accordance with one or more embodiments, a sensing signal receiver for a display device includes a first number of analog front ends; a second number of multiplexers, each of the second number of multiplexers coupled to a different plurality of the first number of analog front ends, and a third number of analog-to-digital converters coupled to outputs of respective ones of the second number of multiplexers, wherein each of the first number of analog front ends is configured to process sensing signals to output demodulation signals, each of the second number of multiplexers are configured to select at least one of the demodulation signals output from one of the analog front ends, and each of the analog-to-digital converters is configured to convert at least the selected one of the demodulation signals to a digital sensing value, wherein each of the second number of multiplexers and the third number of analog-to-digital converters is less than the first number of analog front ends.

Sampling rates of each of the third number of analog-to-digital converters are different in different operating modes. Resolutions of the third number of analog-to-digital converters are different in different operating modes. Each of the second number of multiplexers sequentially may select the demodulation signals output from the analog front ends.

BRIEF DESCRIPTION OF THE DRAWINGS

Illustrative, non-limiting embodiments will be more clearly understood from the following detailed description taken in conjunction with the accompanying drawings.

DETAILED DESCRIPTION OF THE EMBODIMENTS

Hereinafter, an input sensing device and a display device according to embodiments of the present disclosure will be described in more detail with reference to the accompanying drawings. The same or similar reference numerals will be used for the same elements in the accompanying drawings.

Figure 1:
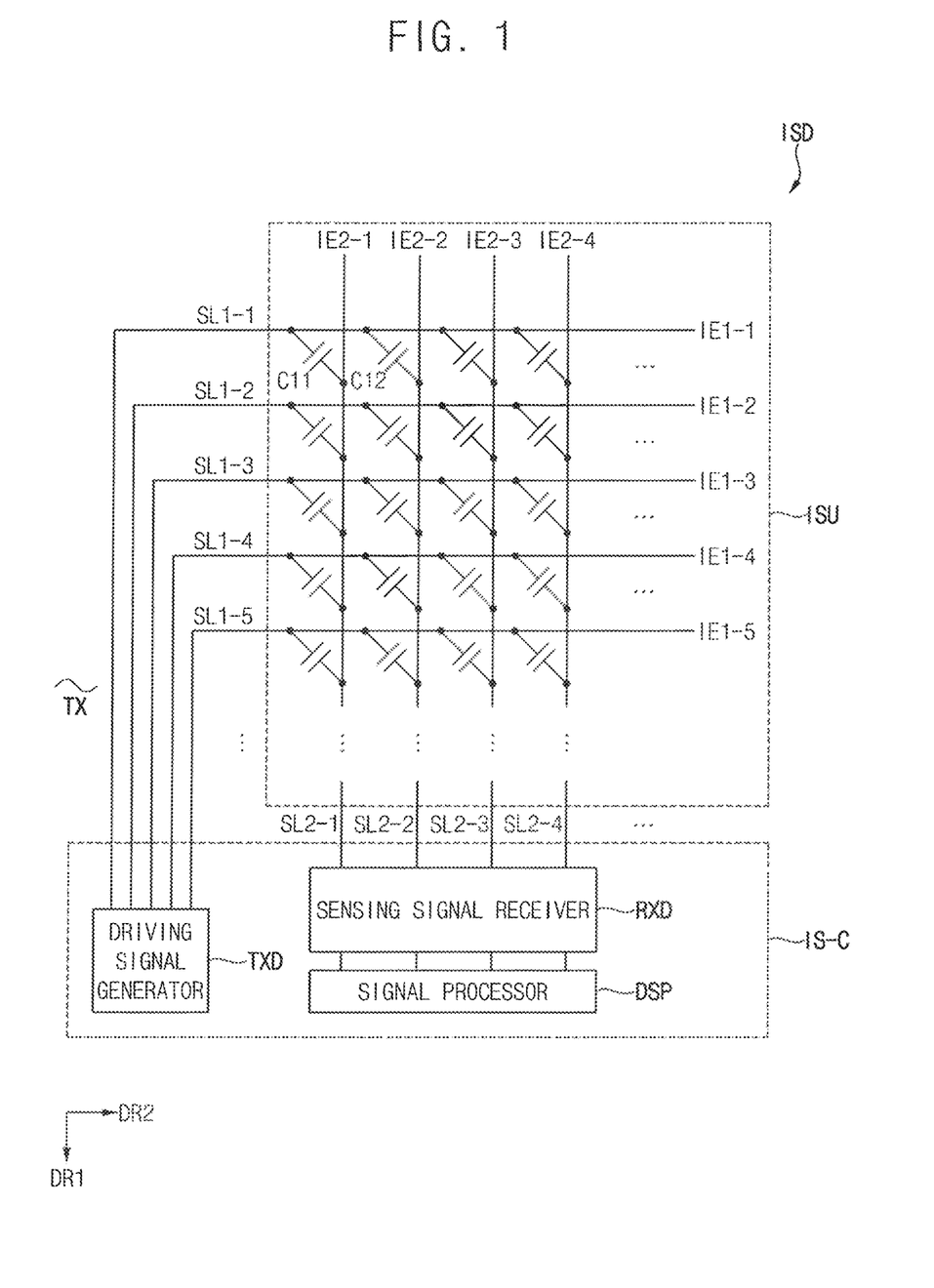
FIG. 1 is a view showing an input sensing device according to an embodiment of the present disclosure.

FIG. 1 is a view showing an input sensing device ISD according to an embodiment of the present disclosure.

Referring to FIG. 1, an input sensing device ISD may include an input sensing unit ISU and an input sensing circuit IS-C. The input sensing unit ISU (or an input sensing layer, or an input sensing panel) may include driving electrodes IE1-1, IE1-2, IE1-3, IE1-4, IE1-5, ... (or first sensing electrodes, or transmission electrodes), sensing electrodes IE2-1, IE2-2, IE2-3, IE2-4, ... (or second sensing electrodes, or reception electrodes), driving signal lines SL1-1, SL1-2, SL1-3, SL1-4, SL1-5, ... (or first signal lines, or transmission signal lines), and sensing signal lines SL2-1, SL2-2, SL2-3, SL2-4, ... (or second signal lines, or reception signal lines).

The driving electrodes IE1-1, IE1-2, IE1-3, IE1-4, IE1-5, ... may extend in a second direction DR2, and may be arranged to be spaced apart from each other in a first direction DR1. The sensing electrodes IE2-1, IE2-2, IE2-3, IE2-4, ... may extend in the first direction DR1, and may be arranged to be spaced apart from each other in the second direction DR2.

The driving signal lines SL1-1, SL1-2, SL1-3, SL1-4, SL1-5, ... may be connected to the driving electrodes IE1-1, IE1-2, IE1-3, IE1-4, IE1-5, ..., respectively. For example, a first driving signal line SL1-1 may be connected to a first driving electrode IE1-1, and a second driving signal line SL1-2 may be connected to a second driving electrode IE1-2, and so on.

The sensing signal lines SL2-1, SL2-2, SL2-3, SL2-4, ... may be connected to the sensing electrodes IE2-1, IE2-2, IE2-3, IE2-4, ..., respectively. For example, a first sensing signal line SL2-1 may be connected to a first sensing electrode IE2-1, and a second sensing signal line SL2-2 may be connected to a second sensing electrode IE2-2, and so on. In FIG. 1, four driving signal lines, four driving electrodes, four sensing signal lines, and four sensing electrodes are shown. In another embodiment, a different number of these electrodes and lines may be provided.

The input sensing circuit IS-C may include a driving signal generator TXD, a sensing signal receiver RXD, and a signal processor DSP. The driving signal generator TXD may generate driving signals TX, and provide the driving signals TX to the driving electrodes IE1-1, IE1-2, IE1-3, IE1-4, IE1-5, . . . . Each of the driving signals TX may have a predetermined (e.g., alternating) voltage waveform. Examples include a sine wave or a square wave. According to an embodiment, the driving signals TX may have the same waveform and phase. The driving signals TX may be provided to the driving electrodes IE1-1, IE1-2, IE1-3, IE1-4, IE1-5, . . . in substantially simultaneously, or in one embodiment may be provided sequentially to the driving electrodes IE1-1, IE1-2, IE1-3, IE1-4, IE1-5, . . . .

According to the driving signals TX provided to the driving electrodes IE1-1, IE1-2, IE1-3, IE1-4, IE1-5, . . . , sensing capacitances may be formed between the driving electrodes IE1-1, IE1-2, IE1-3, IE1-4, IE1-5, . . . and respective ones of the sensing electrodes IE2-1, IE2-2, IE2-3, IE2-4, . . . . For example, a sensing capacitance C11 may be formed between the first driving electrode IE1-1 and the first sensing electrode IE2-1, a sensing capacitance C12 may be formed between the first driving electrode IE1-1 and the second sensing electrode IE2-2, and so on.

When a touch event occurs in a specific region of the input sensing unit ISU, a sensing capacitance between a driving electrode and a sensing electrode located in the specific region may be changed. For example, when a touch event occurs in a region where the first driving electrode IE1-1 and the first sensing electrode IE2-1 intersect each other, the size of the sensing capacitance C11 between the first driving electrode IE1-1 and the first sensing electrode IE2-1 may be changed. In this case, the size of the sensing capacitance C12 between the first driving electrode IE1-1 and the second sensing electrode IE2-2, that is adjacent to the first sensing electrode IE2-1, may not be changed. Accordingly, a first sensing signal output from the first sensing signal line SL2-1 may be changed, a second sensing signal output from the second sensing signal line SL2-2 may not be changed, and the location in which a touch has occurred may be detected based on the changed first sensing signal.

The sensing signal receiver RXD may receive sensing signals (in analog form) corresponding to the driving signals TX from the sensing electrodes IE2-1, IE2-2, IE2-3, IE2-4, . . . . The sensing signal receiver RXD may process and convert the analog sensing signals to output digital sensing values. The signal processor DSP may receive the digital sensing values from the sensing signal receiver RXD, and may determine a touch state or calculate a location at which a touch input has occurred based on the digital sensing values.

Figure 2:
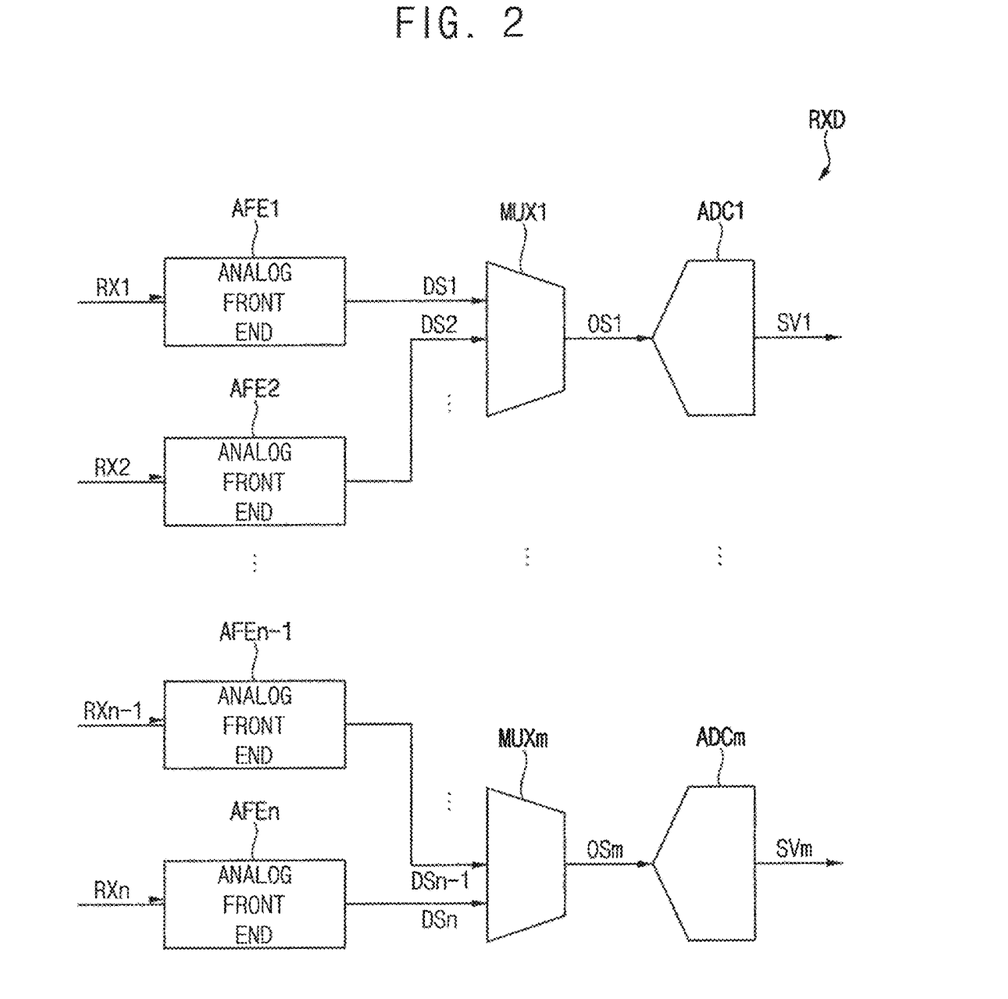
FIG. 2 is a block diagram showing an embodiment of a sensing signal receiver included in the input sensing device of FIG. 1.

FIG. 2 is a block diagram showing a sensing signal receiver RXD included in the input sensing device ISD of FIG. 1 according to an embodiment.

Referring to FIGS. 1 and 2, the sensing signal receiver RXD may include analog front ends AFE1, AFE2, . . . , AFEn−1, and AFEn (where n is a natural number that is greater than or equal to 2), multiplexers MUX1, . . . , and MUXm (where m is a natural number that is greater than or equal to 1, and less than n), and analog-to-digital converters ADC1, . . . , and ADCm. The analog front ends may correspond to hardware (e.g., circuits), software, or a combination thereof to generate output signals.

The analog front ends AFE1, AFE2, . . . , AFEn−1, and AFEn may be connected to the sensing signal lines SL2-1, SL2-2, SL2-3, SL2-4, . . . , respectively. The analog front ends AFE1, AFE2, . . . , AFEn−1, and AFEn may process sensing signals RX1, RX2, . . . , RXn−1, and RXn provided from the sensing electrodes IE2-1, IE2-2, IE2-3, IE2-4, . . . to output demodulation signals DS1, DS2, . . . , DSn−1, and DSn.

The multiplexers MUX1, . . . , and MUXm may be connected to a predetermined number of the analog front ends AFE1, AFE2, . . . , AFEn−1, and AFEn. For example, the multiplexers MUX1, . . . , and MUXm may be connected to the analog front ends AFE1, AFE2, . . . , AFEn−1, and AFEn at 1:k (where k is a natural number that is greater than 1 but less than n). For example, a first multiplexer MUX1 may be connected to at least a first analog front end AFE1 and a second analog front end AFE2, and an $m^{th}$ multiplexer MUXm may be connected to at least an $(n-1)^{th}$ analog front end AFEn−1 and an $n^{th}$ analog front end AFEn. Accordingly, the number of multiplexers MUX1, . . . , and MUXm may be less than the number of analog front ends AFE1, AFE2, . . . , AFEn−1, and AFEn, which may contribute to the ability to reduce the size of the sensing signal receiver RXD and its host display device.

Each of the multiplexers MUX1, . . . , and MUXm may select one of the demodulation signals provided from the analog front ends that are connected to the multiplexers MUX1, . . . , and MUXm. For example, the first multiplexer MUX1 may select one of a first demodulation signal DS1, a second demodulation signal DS2, and the like, and the $m^{th}$ multiplexer MUXm may select one of an $n^{th}$ demodulation signal DSn, an $(n-1)^{th}$ demodulation signal DSn−1, and the like. According to an embodiment, each of the multiplexers MUX1, . . . , and MUXm may sequentially select the demodulation signals provided from the analog front ends connected to the multiplexers MUX1, . . . , and MUXm in a time division manner. In another embodiment, the multiplexers may simultaneously select the demodulation signals.

The analog-to-digital converters ADC1, . . . , and ADCm may be connected to the multiplexers MUX1, . . . , and MUXm, respectively. For example, a first analog-to-digital converter ADC1 may be connected to the output of the first multiplexer MUX1, and an $m^{th}$ analog-to-digital converter ADCm may be connected to the output of the $m^{th}$ multiplexer MUXm. Accordingly, the number of analog-to-digital converters ADC1, . . . , and ADCm may be less than the number of analog front ends AFE1, AFE2, . . . , AFEn−1, and AFEn. Therefore, the area of the input sensing circuit IS-C may be reduced and also power consumption of the input sensing circuit IS-C may be reduced.

The analog-to-digital converters ADC1, . . . , and ADCm may convert analog output signals OS1, . . . , and OSm provided from the multiplexers MUX1, . . . , and MUXm into digital sensing values SV1, . . . , and SVm. For example, the first analog-to-digital converter ADC1 may convert an analog first output signal OS1 into a digital first sensing value SV1, and the $m^{th}$ analog-to-digital converter ADCm may convert an analog $m^{th}$ output signal OSm into a digital $m^{th}$ sensing value SVm.

Figure 3:
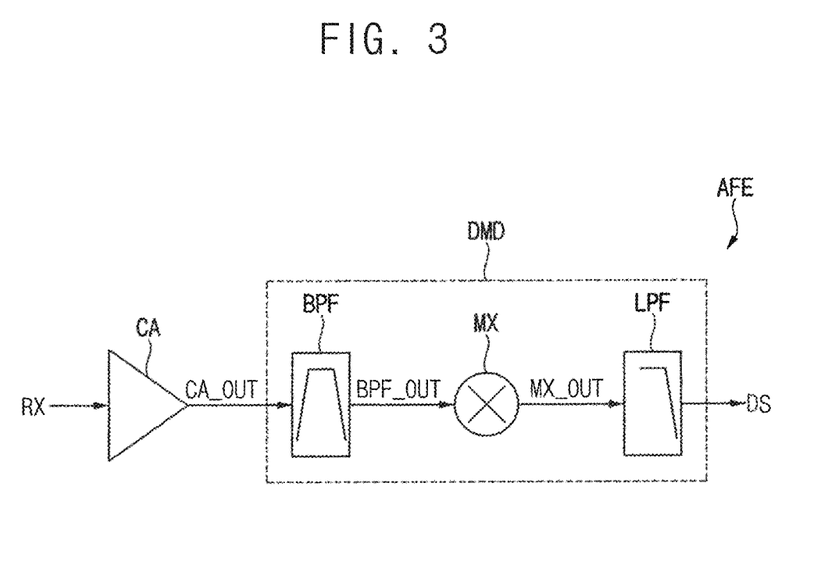
FIG. 3 is a block diagram showing an analog front end according to an embodiment of the present disclosure.

FIG. 3 is a block diagram showing an analog front end AFE according to an embodiment of the present disclosure. An analog front end AFE of FIG. 3 may correspond to one of the analog front ends AFE1, AFE2, . . . , AFEn−1, and AFEn of FIG. 2.

Referring to FIG. 3, the analog front end AFE may include a charge amplifier CA and a demodulator DMD. The charge amplifier CA may receive a sensing signal RX, and amplify the sensing signal RX to output an amplification signal CA_OUT. The sensing signal RX may correspond to one of the sensing signals RX1, RX2, . . . , RXn−1, and RXn of FIG. 2.

The demodulator DMD may demodulate the amplification signal CA_OUT to output a demodulation signal DS. The demodulator DMD may restore or extract only a signal corresponding to a driving signal TX from the sensing signal RX. The demodulation signal DS may correspond to one of the demodulation signals DS1, DS2, . . . , DSn−1, and DSn of FIG. 2. According to an embodiment, the demodulator DMD may include a band pass filter BPF, a mixer MX, and a low pass filter LPF.

The band pass filter BPF may output a signal BPF_OUT obtained by filtering the amplification signal CA_OUT by selecting a specific frequency band. The band pass filter BPF may have a first transfer function corresponding to a frequency band of the sensing signal RX, and may amplify only a signal within the frequency band of the sensing signal RX.

The mixer MX may change a frequency of the signal BPF_OUT obtained through the filtering to output a frequency conversion signal MX_OUT. The mixer MX may convert a signal in a relatively high frequency band (e.g., a signal within a frequency band corresponding to the band pass filter BPF) into the frequency conversion signal MX_OUT within a lower frequency band. This may be accomplished, for example, by mixing the signal BPT_OUT with an intermediate or carrier frequency. In addition, the mixer MX may convert a noise component in a relatively low frequency band into a high frequency noise within a high frequency band. This conversion may make it easier to remove the noise component, as described below.

The low pass filter LPF may filter out the noise component distributed in a high frequency band of the frequency conversion signal MX_OUT, to output the demodulation signal DS. The low pass filter LPF may have a second transfer function corresponding to a frequency band of the frequency conversion signal MX_OUT, and may amplify only the frequency conversion signal MX_OUT within the lower frequency band to output the demodulation signal DS.

Figure 4A:
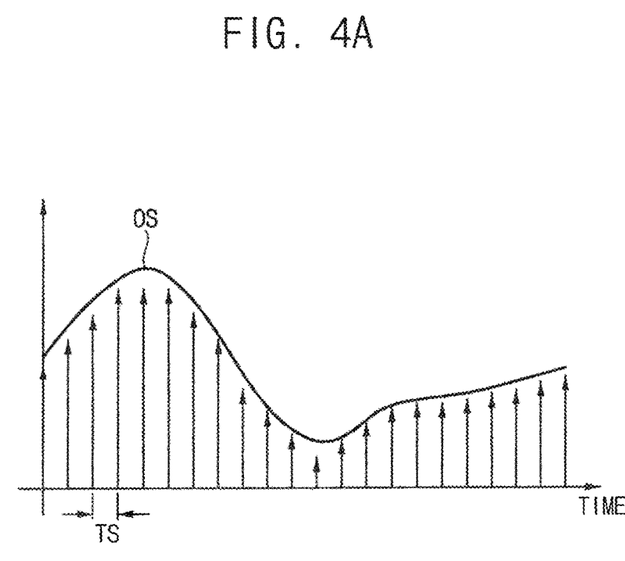
FIGS. 4A and 4B are views for describing signal conversion of an analog-to-digital converter according to an embodiment.
Figure 4B:
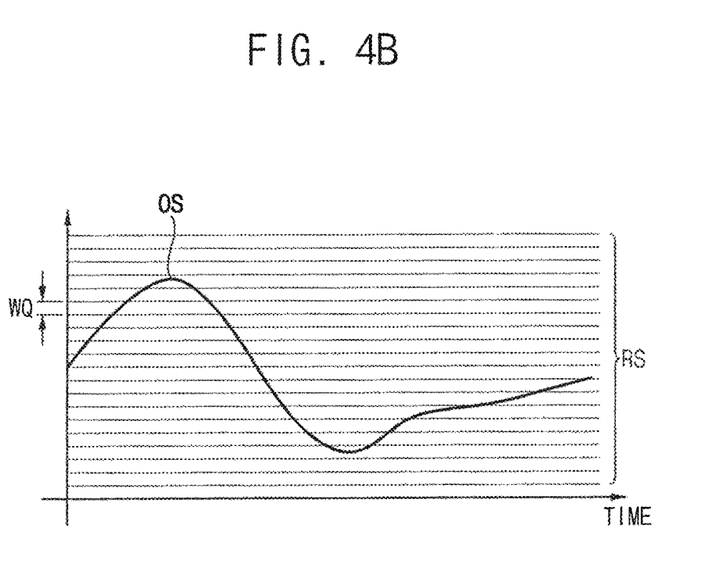

FIGS. 4A and 4B are views for describing an example of signal conversion performed by an analog-to-digital converter. In this example, the analog-to-digital converter may sample and quantize an analog output signal OS (FIG. 4B) to convert the analog output signal OS into a digital sensing value.

The analog-to-digital converter may sample the output signal OS at a predetermined time interval (a sampling period TS in FIG. 4A). The sampling rate of the analog-to-digital converter may be a reciprocal of the sampling period TS. As the sampling rate of the analog-to-digital converter increases, the processing speed of the analog-to-digital converter may be gradually increased. As the sampling rate of the analog-to-digital converter decreases, power consumption of the analog-to-digital converter may be gradually decreased.

The analog-to-digital converter may quantize the sampled output signal OS at a predetermined quantization interval WQ (FIG. 4B) to generate the digital sensing value. A resolution RS (or a resolving power) of the analog-to-digital converter may be inversely proportional to the quantization interval WQ. For example, when the resolution RS of the analog-to-digital converter is n bits, the sampled output signal OS may be converted into a sensing value having $2n$ levels. As the resolution RS of the analog-to-digital converter increases, a quantization error of the sensing value may be gradually decreased, so that the output signal OS may be converted into the digital sensing value more precisely. As the resolution RS of the analog-to-digital converter decreases, the power consumption of the analog-to-digital converter may be gradually decreased.

Figure 5:
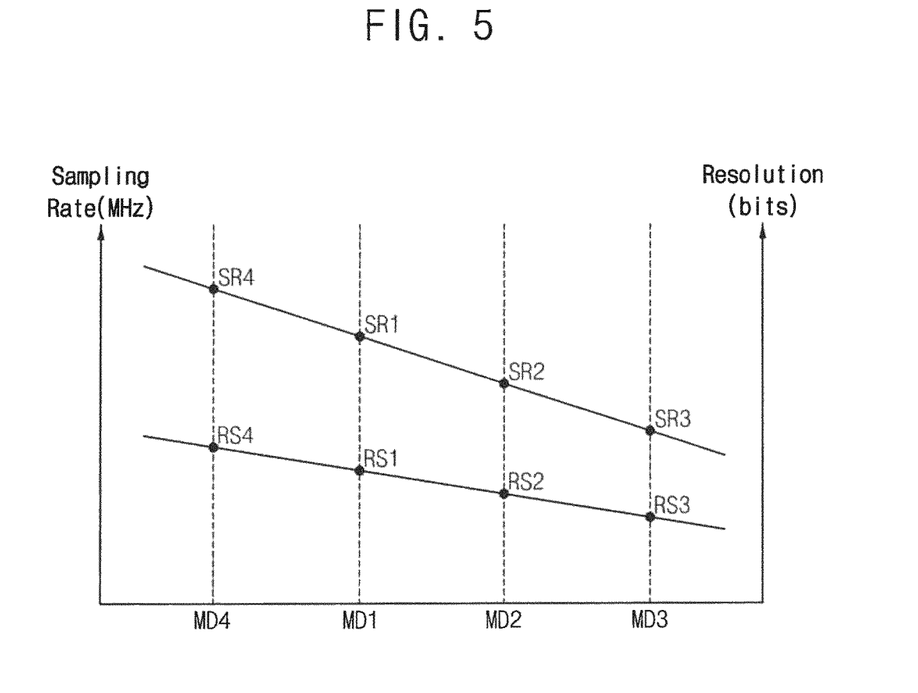
FIG. 5 is a view for describing a sampling rate and a resolution of an analog-to-digital converter according to an embodiment that is applied in an operating mode.

FIG. 5 is a view for describing a sampling rate and a resolution of an analog-to-digital converter according to an operating mode for an embodiment.

Referring to FIG. 5, sampling rates SR1, SR2, SR3, and SR4 and/or resolutions RS1, RS2, RS3, and RS4 of an analog-to-digital converter may be different from each other according to operating modes MD1, MD2, MD3, and MD4.

According to an embodiment, the operating modes MD1, MD2, MD3, and MD4 may include a normal mode MD1, a standby mode MD2, a low power mode MD3, and a high speed mode MD4. When an input such as a touch of a user does not occur in an input sensing device (ISD of FIG. 1) for a predetermined time, the input sensing device ISD may switch from the normal mode MD1 to the standby mode MD2. The low power mode MD3 may be a mode for reducing or minimizing power consumption of the input sensing device ISD. The high speed mode MD4 may be a mode for rapidly and accurately processing the input of the user when an electronic device including the input sensing device ISD executes a predetermined (e.g., game) application or the like.

A second sampling rate SR2 of the analog-to-digital converter in the standby mode MD2 may be lower than a first sampling rate SR1 of the analog-to-digital converter in the normal mode MD1. According to an embodiment, the first sampling rate SR1 may be about 2 MHz, and the second sampling rate SR2 may be about 1 MHz. A second resolution RS2 of the analog-to-digital converter in the standby mode MD2 may be lower than a first resolution RS1 of the analog-to-digital converter in the normal mode MD1. According to an embodiment, the first resolution RS1 may be 12 bits, and the second resolution RS2 may be less than 12 bits. Accordingly, power consumption of the analog-to-digital converter may be reduced in the standby mode MD2.

A third sampling rate SR3 of the analog-to-digital converter in the low power mode MD3 may be lower than the second sampling rate SR2. According to an embodiment, the third sampling rate SR3 may be about 0.5 MHz to about 1.0 MHz. A third resolution RS3 of the analog-to-digital converter in the low power mode MD3 may be lower than the second resolution RS2. According to an embodiment, the third resolution RS3 may be less than about 12 bits. Accordingly, the power consumption of the analog-to-digital converter may be further reduced in the low power mode MD3.

A fourth sampling rate SR4 of the analog-to-digital converter in the high speed mode MD4 may be higher than the first sampling rate SR1. According to an embodiment, the fourth sampling rate SR4 may be about 4 MHz. A fourth resolution RS4 of the analog-to-digital converter in the high speed mode MD4 may be higher than the first resolution RS1. According to an embodiment, the fourth resolution RS4 may be greater than 12 bits, and less than or equal to 16 bits. Accordingly, the processing speed of the input of the user and the accuracy of the sensing value may be increased in the high speed mode MD4.

Figure 6:
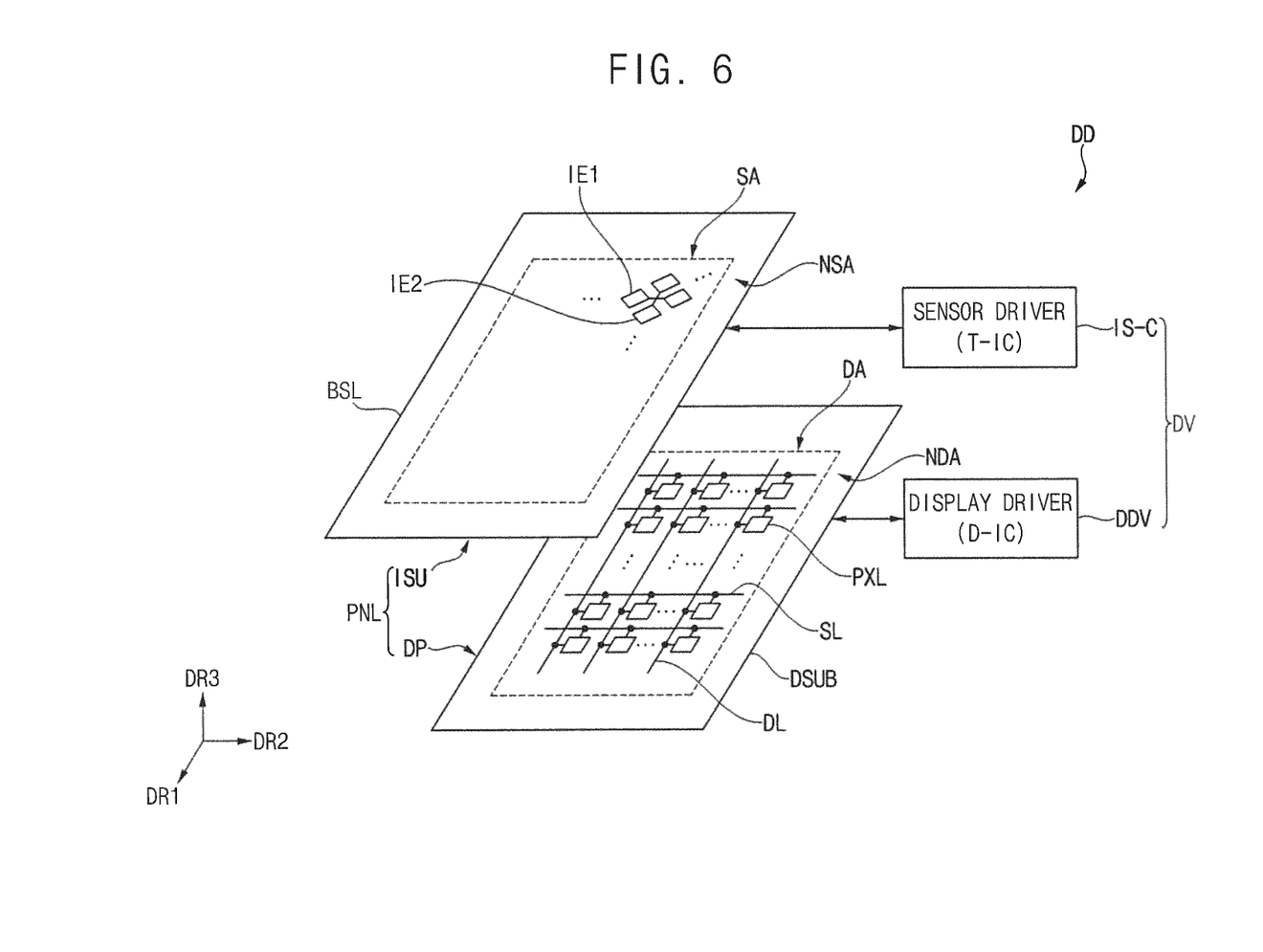
FIG. 6 is a view showing a display device according to an embodiment of the present disclosure.

FIG. 6 is a view showing a display device DD according to an embodiment of the present disclosure.

Referring to FIG. 6, the display device DD may include a panel PNL and a driving circuit part DV. The driving circuit part DV may drive the panel PNL. The panel PNL may include a display panel DP and an input sensing unit ISU. The display panel DP may display an image. The input sensing unit ISU may sense an input such as a touch of a user. The input sensing unit ISU may correspond to the input sensing unit ISU of FIG. 1.

The driving circuit part DV may include a display driver DDV and an input sensing circuit IS-C (or a sensor driver). The display driver DDV may drive the display panel DP. The input sensing circuit IS-C may drive the input sensing unit ISU. The input sensing circuit IS-C may correspond to the input sensing circuit IS-C of FIG. 1.

According to an embodiment, the display panel DP and the input sensing unit ISU may be manufactured separately from each other, and coupled to each other. According to an embodiment, the display panel DP and the input sensing unit ISU may be manufactured integrally with each other. For example, the input sensing unit ISU may be formed directly on the display panel DP.

The display panel DP may include a display substrate DSUB, scan lines SL, data lines DL, and pixels PXL. The display substrate DSUB may include a display region DA and a non-display region NDA. An image may be displayed in the display region DA, and the non-display region NDA may be adjacent to the display region DA. According to an embodiment, the display region DA may be disposed in a central region of the display substrate DSUB, and the non-display region NDA may be disposed in an edge region of the display substrate DSUB to surround the display region DA.

The display substrate DSUB may be a rigid substrate or a flexible substrate. For example, the display substrate DSUB may be a rigid substrate including glass or tempered glass, or a flexible substrate including a thin film formed of plastic or a metal. In one embodiment, the display substrate DSUB may be rolled, bent, for folded.

The scan lines SL, the data lines DL, and the pixels PXL may be arranged in the display region DA. The scan lines SL may extend in a second direction DR2, and may be arranged and spaced apart from each other in a first direction DR1. The data lines DL may extend in the first direction DR1, and may be arranged and spaced apart from each other in the second direction DR2. The pixels PXL may be connected to respective ones of the scan lines SL and the data lines DL. The pixels PXL may be selected by scan signals provided from the scan lines SL to emit light corresponding to data signals provided from the data lines DL. Accordingly, an image corresponding to the data signals may be displayed in the display region DA.

The input sensing unit ISU may include a base layer BSL, driving electrodes IE1, and sensing electrodes IE2. The base layer BSL may include a sensing region SA and a non-sensing region NSA. The sensing region SA may sense the input of the user, and the non-sensing region NSA may be adjacent to the sensing region SA. According to an embodiment, the sensing region SA may overlap the display region DA, and the non-sensing region NSA may overlap the non-display region NDA. In this case, when the input of the user is provided on the display region DA, a touch input may be detected through the input sensing unit ISU.

The driving electrodes IE1 and the sensing electrodes IE2 may be disposed in the sensing region SA on the base layer BSL. According to an embodiment, each of the driving electrodes IE1 may be configured such that driving cells and driving bridges are alternately connected to each other in the second direction DR2 and according to a predetermined shape. For example, the driving cell has been shown in FIG. 6 as having a diamond shape. In other embodiments, the driving cell may have, for example, a circular shape, a quadrangular shape, a triangular shape, a mesh shape, or the like. According to an embodiment, each of the sensing electrodes IE2 may be configured such that sensing cells and sensing bridges are alternately connected to each other in the first direction DR1. Although the sensing cell has been shown in FIG. 6 as having a diamond shape, the sensing cell may have a circular shape, a quadrangular shape, a triangular shape, a mesh shape, or the like.

Figure 7:
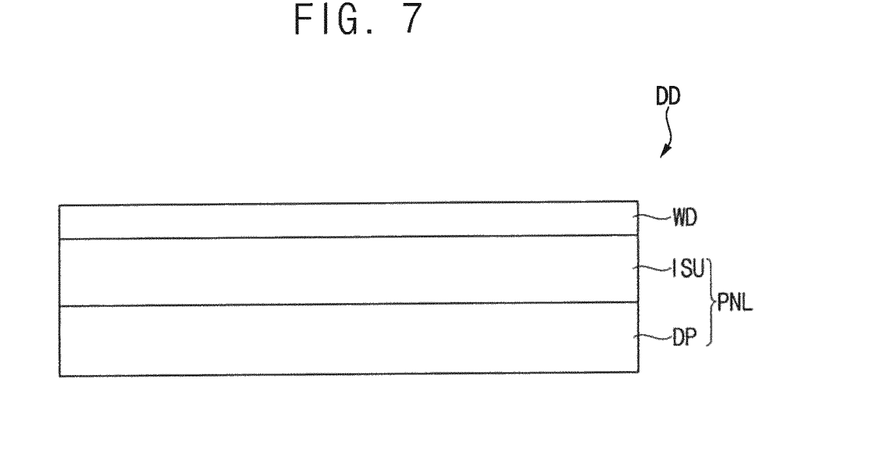
FIG. 7 is a sectional view schematically showing a display device according to an embodiment of the present disclosure.

FIG. 7 is a sectional view schematically showing a display device DD according to an embodiment of the present disclosure.

Referring to FIG. 7, the input sensing unit ISU may be disposed on the display panel DP, and a window WD may be disposed on the input sensing unit ISU (or a panel PNL). According to an embodiment, the display panel DP may be, for example, a spontaneous emission display panel. For example, the display panel DP may be an organic light emitting display panel, an inorganic light emitting display panel, a quantum dot/well light emitting display panel, or the like. According to an embodiment, the display panel DP may be a non-spontaneous emission display panel. For example, the display panel DP may be a liquid crystal display panel or the like. When the display panel DP is a non-spontaneous emission display panel, the display device DD may further include a light source such as a backlight unit.

The input sensing unit ISU may obtain information on an input of a user. According to an embodiment, the input sensing unit ISU may sense the input of the user by a capacitive sensing scheme. For example, the input sensing unit ISU may sense the input of the user by a mutual capacitive scheme or a self-capacitive scheme. The input sensing unit ISU may be, for example, the input sensing unit shown in FIG. 1.

The window WD may protect the panel PNL and may transmit light. The window WD may have a multilayer structure selected from a glass substrate, a plastic film, a plastic substrate, and the like. The window WD may include a rigid or flexible material. The display device DD may further include a polarizer and the like, which are disposed between the window WD and the input sensing unit ISU. The polarizer may prevent external light transmitted through the window WD from being reflected.

Figure 8:
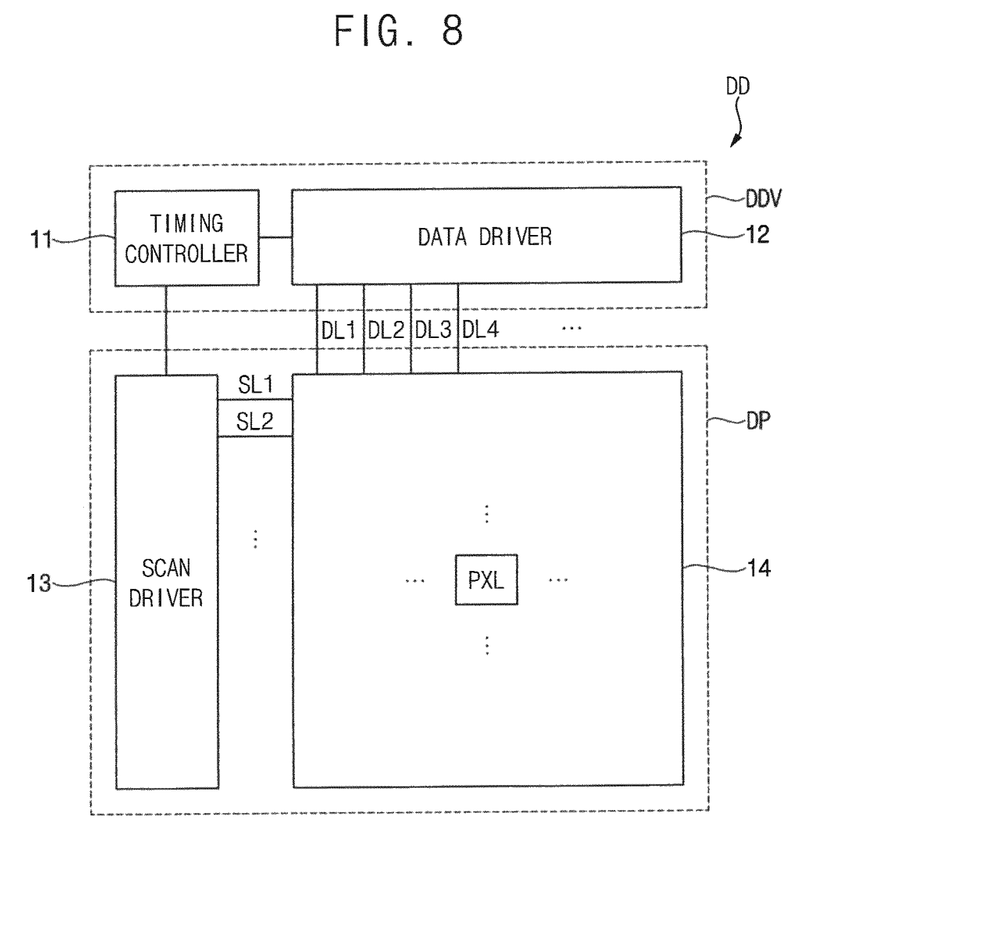
FIG. 8 is a block diagram showing a display panel and a display driver according to an embodiment of the present disclosure.

FIG. 8 is a block diagram showing a display panel DP and a display driver DDV according to an embodiment of the present disclosure.

Referring to FIG. 8, the display driver DDV may include a timing controller 11 and a data driver 12. The display panel DP may include a scan driver 13 and a pixel array 14. In operation, the timing controller 11 may receive input image data and an input control signal from an external device (e.g., a processor). The input control signal may include a vertical synchronization signal, a horizontal synchronization signal, a data enable signal, and the like.

The data driver 12 may generate data signals based on output image data and a data control signal provided from the timing controller 11. The data driver 12 may output the data signals to respective ones of the data lines DL1, DL2, DL3, DL4, . . . .

The scan driver 13 may generate scan signals based on a scan start signal, a scan clock signal, and the like provided from the timing controller 11. The scan driver 13 may sequentially output the scan signals to scan lines SL1, SL2, . . . . In one embodiment, the scan driver 13 may include scan stages configured in the form of a shift register.

The pixel array 14 may include pixels PXL. The pixels PXL may emit light of a plurality of colors. For example, the pixels PXL may include first pixels configured to emit a light having a first color, second pixels configured to emit a light having a second color, and third pixels configured to emit a light having a third color. The first color, the second color, and the third color may be colors that are different from each other. According to an embodiment, the first color, the second color, and the third color may be red, green, and blue, respectively. According to an embodiment, the first color, the second color, and the third color may be magenta, cyan, and yellow, respectively.

Figure 9:
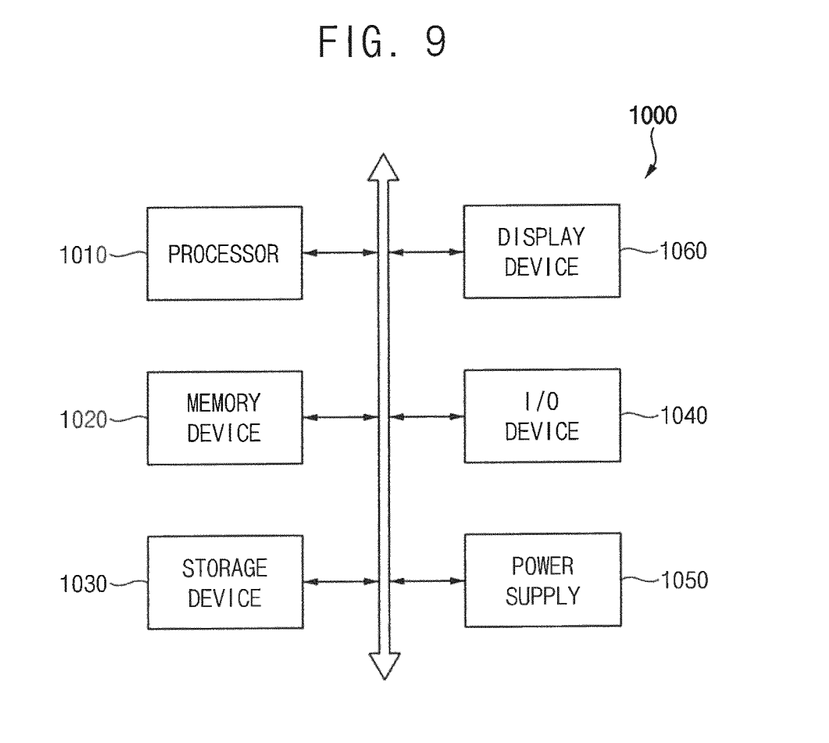
FIG. 9 is a block diagram showing an electronic device according to an embodiment of the present disclosure.

FIG. 9 is a block diagram showing an electronic device 1000 according to an embodiment of the present disclosure.

Referring to FIG. 9, the electronic device 1000 may include a processor 1010, a memory device 1020, a storage device 1030, an input/output (I/O) device 1040, a power supply 1050, and a display device 1060. The display device 1060 may correspond to the display device DD of FIGS. 6 to 8. The electronic device 1000 may further include a plurality of ports capable of communicating with a video card, a sound card, a memory card, a USB device, and the like, or communication with other systems.

The processor 1010 may perform specific calculations or tasks. According to an embodiment, the processor 1010 may be a microprocessor, a central processing unit (CPU), or the like. The processor 1110 may be connected to other components through an address bus, a control bus, a data bus, and the like. According to an embodiment, the processor 1010 may also be connected to an expansion bus such as a peripheral component interconnect (PCI) bus. According to an embodiment, the processor 1010 may provide input image data and an input control signal to the display device 1060. In some embodiments, the processor 1010 may correspond to the digital signal processor DSP of FIG. 1.

The memory device 1020 may store data for an operation of the electronic device 1000. For example, memory device 1020 may include: a nonvolatile memory device such as an erasable programmable read-only memory (EPROM), an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), or a ferroelectric random access memory (FRAM); and/or a volatile memory device such as a dynamic random access memory (DRAM), a static random access memory (SRAM), or a mobile DRAM.

The storage device 1030 may include a solid state drive (SSD), a hard disk drive (HDD), a CD-ROM, and the like. The I/O device 1040 may include an input device and an output device. The input device 1040 may receive the touch inputs as described herein. The input device 1040 may be, for example, a keyboard, a keypad, a touch pad, a touch screen, or a mouse. The output device may be, for example, a speaker or a printer. The power supply 1050 may supply a power for operation of the electronic device 1000. The display device 1060 may be connected to other components through the buses or other communication links.

The display device according to the embodiments may be used in a host device, such as but not limited to a computer, a notebook, a mobile phone, a smart phone, a smart pad, a smart watch, a PMP, a PDA, an MP3 player, or the like.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments or operations of the apparatus embodiments herein.

The controllers, processors, devices, multiplexers, mixers, converters, logic, drivers, demodulators, filters, amplifiers, and other signal generating and signal processing features of the embodiments disclosed herein may be implemented, for example, in non-transitory logic that may include hardware, software, or both. When implemented at least partially in hardware, the controllers, processors, devices, multiplexers, mixers, converters, logic, drivers, demodulators, filters, amplifiers, and other signal generating and signal processing features may be, for example, any one of a variety of integrated circuits including but not limited to an application-specific integrated circuit, a field-programmable gate array, a combination of logic gates, a system-on-chip, a microprocessor, or another type of processing or control circuit. In some embodiments, these features may be implemented by a neural network, machine-learning logic, or other form of artificial intelligence.

When implemented in at least partially in software, the controllers, processors, devices, multiplexers, mixers, converters, logic, drivers, demodulators, filters, amplifiers, and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

Although the embodiments have been described with reference to the drawings, the illustrated embodiments are examples, and may be modified and changed by a person having ordinary knowledge in the relevant technical field without departing from the technical spirit described in the following claims. The embodiments may be combined to form additional embodiments.

What is claimed is:

1. An input sensing device comprising:
   driving electrodes and sensing electrodes;
   analog front ends configured to process sensing signals provided from the sensing electrodes to output demodulation signals;
   a multiplexer connected to the analog front ends and configured to select one of the demodulation signals; and an analog-to-digital converter configured to convert an
analog output signal provided from the multiplexer into
a digital sensing value,
wherein sampling rates of the analog-to-digital converter
are different from each other in different operating
modes,
wherein each of the analog front ends includes a demodulator directly connected to an input of the multiplexer, respectively.

2. The input sensing device of claim 1, wherein:
the different operating modes include a normal mode and a standby mode, and
a second sampling rate of the analog-to-digital converter in the standby mode is lower than a first sampling rate of the analog-to-digital converter in the normal mode,
each of the analog front ends further includes a charge amplifier connected between a sensing electrode and its demodulator, respectively.

3. The input sensing device of claim 2, wherein:
the different operating modes further include a low power mode, and
a third sampling rate of the analog-to-digital converter in the low power mode is lower than the second sampling rate,
the multiplexer includes an output directly connected to the analog-to-digital converter.

4. The input sensing device of claim 3, wherein:
the different operating modes further include a high speed mode, and
a fourth sampling rate of the analog-to-digital converter in the high speed mode is higher than the first sampling rate.

5. The input sensing device of claim 1, wherein resolutions of the analog-to-digital converter are different from each other in the different operating modes.

6. The input sensing device of claim 5, wherein:
the different operating modes include a normal mode and a standby mode, and
a second resolution of the analog-to-digital converter in the standby mode is lower than a first resolution of the analog-to-digital converter in the normal mode.

7. The input sensing device of claim 6, wherein:
the different operating modes further include a low power mode, and
a third resolution of the analog-to-digital converter in the low power mode is lower than the second resolution.

8. The input sensing device of claim 7, wherein:
the different operating modes further include a high speed mode, and
a fourth resolution of the analog-to-digital converter in the high speed mode is higher than the first resolution.

9. The input sensing device of claim 1, wherein the multiplexer is connected to the analog front ends at 1:k (where k is a natural number that is greater than 1).

10. The input sensing device of claim 1, wherein:
each of the analog front ends further includes a charge amplifier configured to amplify a sensing signal corresponding to the analog front end among the sensing signals to output an amplification signal,
the demodulator of each of the analog front ends is configured to demodulate the amplification signal to output a demodulation signal corresponding to the analog front end among the demodulation signals.

11. The input sensing device of claim 10, wherein the demodulator includes:
a band pass filter configured to output a signal obtained by filtering the amplification signal by selecting a specific frequency band;
a mixer configured to change a frequency of the signal obtained through the filtering to output a frequency conversion signal; and
a low pass filter configured to filter a noise of the frequency conversion signal to output the demodulation signal.

12. The input sensing device of claim 1, further comprising:
a driving signal generator configured to provide driving signals to the driving electrodes; and
a signal processor configured to sense an external input based on the sensing value.

13. An input sensing device comprising:
driving electrodes and sensing electrodes;
analog front ends configured to process sensing signals provided from the sensing electrodes to output demodulation signals;
a multiplexer connected to the analog front ends and configured to select one of the demodulation signals; and
an analog-to-digital converter configured to convert an analog output signal provided from the multiplexer into a digital sensing value,
wherein resolutions of the analog-to-digital converter are different from each other in different operating modes,
wherein each of the analog front ends includes a demodulator directly connected to an input of the multiplexer, respectively.

14. The input sensing device of claim 13, wherein:
the different operating modes include a normal mode and a standby mode, and
a second resolution of the analog-to-digital converter in the standby mode is lower than a first resolution of the analog-to-digital converter in the normal mode,
each of the analog front ends further includes a charge amplifier connected between a sensing electrode and its demodulator, respectively.

15. The input sensing device of claim 14, wherein:
the different operating modes further include a low power mode, and
a third resolution of the analog-to-digital converter in the low power mode is lower than the second resolution,
the multiplexer includes an output directly connected to the analog-to-digital converter.

16. The input sensing device of claim 15, wherein:
the different operating modes further include a high speed mode, and
a fourth resolution of the analog-to-digital converter in the high speed mode is higher than the first resolution.

17. The input sensing device of claim 13, wherein the multiplexer is connected to the analog front ends at 1:k (where k is a natural number that is greater than 1).

18. An electronic device comprising:
a display panel configured to display an image;
driving electrodes and sensing electrodes disposed on the display panel;
analog front ends configured to process sensing signals provided from the sensing electrodes to output demodulation signals;
a multiplexer connected to the analog front ends, and configured to select one of the demodulation signals; and an analog-to-digital converter configured to convert an
analog output signal provided from the multiplexer into
a digital sensing value,
wherein sampling rates of the analog-to-digital converter
are different from each other in different operating
modes,
wherein each of the analog front ends includes a demodulator directly connected to an input of the multiplexer, respectively.

19. The electronic device of claim 18, wherein:
resolutions of the analog-to-digital converter are different from each other in the different operating modes,
each of the analog front ends further includes a charge amplifier connected between a sensing electrode and its demodulator, respectively.

20. The electronic device of claim 18, wherein:
the multiplexer is connected to the analog front ends at 1:k (where k is a natural number that is greater than 1),
the multiplexer includes an output directly connected to the analog-to-digital converter.

* * * * *